(12) United States Patent
Lee et al.

(10) Patent No.: US 11,231,763 B2
(45) Date of Patent: Jan. 25, 2022

(54) ELECTRONIC DEVICE AND METHOD FOR CONTROLLING HEAT GENERATED ON SURFACE OF ELECTRONIC DEVICE

(71) Applicant: Samsung Electronics Co., Ltd., Gyeonggi-do (KR)

(72) Inventors: Jong-Min Lee, Seoul (KR); Kwang-Eun Go, Seoul (KR); Kang-Sik Kim, Gyeonggi-do (KR); Dong-Sub Kim, Gyeonggi-do (KR); Young-San Kim, Gyeonggi-do (KR); Won-Min Kim, Gyeonggi-do (KR); Young-Hyun Ban, Seoul (KR); Min-Woo Song, Seoul (KR); Chung-Hyo Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 16/466,089

(22) PCT Filed: Dec. 6, 2017

(86) PCT No.: PCT/KR2017/014248
§ 371 (c)(1),
(2) Date: Jun. 3, 2019

(87) PCT Pub. No.: WO2018/106022
PCT Pub. Date: Jun. 14, 2018

(65) Prior Publication Data
US 2020/0073460 A1  Mar. 5, 2020

(30) Foreign Application Priority Data
Dec. 6, 2016  (KR) .................. 10-2016-0165400

(51) Int. Cl.
*G06F 1/08* (2006.01)
*G06F 1/20* (2006.01)
(Continued)

(52) U.S. Cl.
CPC .............. *G06F 1/3206* (2013.01); *G06F 1/08* (2013.01); *G06F 1/206* (2013.01); *G06F 1/324* (2013.01); *G06F 1/3265* (2013.01)

(58) Field of Classification Search
CPC .......... G06F 1/08; G06F 1/206; G06F 1/3206; G06F 1/324; G06F 1/3265
See application file for complete search history.

(56) References Cited

U.S. PATENT DOCUMENTS

| 7,219,245 B1 | 5/2007 | Raghuvanshi |
| 2012/0110352 A1* | 5/2012 | Branover .............. G06F 1/3296 713/300 |

(Continued)

FOREIGN PATENT DOCUMENTS

| KR | 10-2012-0057285 A | 6/2012 |
| KR | 10-1406545 B1 | 6/2014 |

(Continued)

*Primary Examiner* — Mark A Connolly
(74) *Attorney, Agent, or Firm* — Cha & Reiter, LLC

(57) ABSTRACT

Various embodiments of the present invention relate to an electronic device and a method for controlling heat generated on the surface of the electronic device. The electronic device may comprise a display and a processor, wherein the processor: displays, on the display, graphic elements at the request of a first application; during a first period of time, acquires first information corresponding to the graphic performance of the displayed graphic elements, and identifies a clock control level for controlling operation performance according to execution of the first application; and during a second period of time following the first period of time, identifies a clock value corresponding to the identified clock control level on the basis of the acquired first information, (Continued)

and controls the operation performance according to execution of the first application by using the identified clock value.

17 Claims, 9 Drawing Sheets

(51) Int. Cl.
    *G06F 1/32*     (2019.01)
    *G06F 1/3206*     (2019.01)
    *G06F 1/324*     (2019.01)
    *G06F 1/3234*     (2019.01)

(56) References Cited

U.S. PATENT DOCUMENTS

| | | |
|---|---|---|
| 2012/0133427 A1 | 5/2012 | Kim et al. |
| 2014/0337647 A1* | 11/2014 | Jiang .......... G06F 1/08 713/322 |
| 2015/0261284 A1* | 9/2015 | Lee .......... G06F 1/206 713/323 |
| 2015/0301587 A1 | 10/2015 | Chae et al. |
| 2016/0062326 A1 | 3/2016 | Bang et al. |
| 2016/0062423 A1* | 3/2016 | Kim .......... H04M 1/7246 713/320 |
| 2016/0139638 A1 | 5/2016 | Kim et al. |
| 2016/0231863 A1* | 8/2016 | Huang .......... G06F 1/206 |
| 2016/0252939 A1 | 9/2016 | Bang et al. |

FOREIGN PATENT DOCUMENTS

| | | |
|---|---|---|
| KR | 10-2015-0121845 A | 10/2015 |
| KR | 10-2016-0026329 A | 3/2016 |
| KR | 10-2016-0027757 A | 3/2016 |
| KR | 10-2016-0059801 A | 5/2016 |
| KR | 10-2016-0104965 A | 9/2016 |

* cited by examiner

601

| CLK Level | | |
|---|---|---|
| CLK Level | CPU CLK | GPU CLK |
| 1 | 1600000 | 800 |
| 2 | 1500000 | 734 |
| 3 | 1400000 | 668 |
| 4 | 1300000 | 534 |
| 5 | 1200000 | 440 |
| 6 | 1100000 | 350 |
| 7 | 1000000 | 266 |
| 8 | 900000 | |
| 9 | 800000 | |
| 10 | 700000 | |
| 11 | 600000 | |
| 12 | 500000 | |
| 13 | 400000 | |

603

| CLK Level | | |
|---|---|---|
| CLK Level | CPU CLK | GPU CLK |
| 1 | 1500000 | 800 |
| 2 | 1300000 | 734 |
| 3 | 1200000 | 668 |
| 4 | 1100000 | 534 |
| 5 | 1000000 | 440 |
| 6 | 900000 | 350 |
| 7 | 800000 | 266 |

FIG.6

| TARGET CURRENT ||
|---|---|
| Level | Current |
| 1 | 1600000 |
| 2 | 1500000 |
| 3 | 1400000 |
| 4 | 1300000 |
| 5 | 1200000 |

FIG.7

ELECTRONIC DEVICE AND METHOD FOR CONTROLLING HEAT GENERATED ON SURFACE OF ELECTRONIC DEVICE

CROSS-REFERENCE TO RELATED APPLICATION(S)

This application is a National Phase Entry of PCT International Application No. PCT/KR2017/014248, which was filed on Dec. 6, 2017, and claims priority to Korean Patent Application No. 10-2016-0165400, which was filed on Dec. 6, 2016, the contents of which are incorporated herein by reference.

BACKGROUND

1. Field

Various embodiments of the present disclosure relate to an electronic device and a method for controlling heat generated on a surface of the electronic device.

2. Description of the Related Art

Generally, performance control methods may include a method for controlling performance based on a temperature or a method for controlling performance based on central processing unit (CPU) load regardless of a temperature. In the method for controlling performance based on a temperature, an application list is managed, and in a case where an application belonging to the application list, when executed, reaches a preset temperature based on a temperature sensed from an internal thermistor for predicting a surface temperature, performance such as operating frequency (CLK), etc., is changed to a particular value. Meanwhile, in the method for controlling performance based on CPU load, the CPU load is observed such that operating frequency is increased for a larger load and operating frequency is reduced for a smaller load.

SUMMARY

In a conventional scheme to change a frequency, etc., of a processor based on a temperature, a heat generation situation or a performance situation is handled by fixing and changing the frequency, etc., to a particular value set in a development stage based on a temperature.

However, even in a situation where heat generation on a surface is expected and additional control is possible due to a margin in performance, the conventional scheme may not allow additional control as the frequency of the processor is fixed based on a temperature. As a result, the conventional scheme may not use a way to gently increase a surface temperature or extend a use time, a sensory performance aspect is not considered due to the use of a frequency fixed based on a temperature. A scheme to adjust a frequency level based on a CPU load level merely considers a load level without taking surface heat generation performance into account.

Therefore, various embodiments of the present disclosure provide an electronic device and a method for controlling heat generated on a surface of the electronic device by controlling operation performance of an application before occurrence of surface heat generation that is expected to occur due to execution of the application, based on information capable of expressing graphic sensory performance according to execution of the application including many graphic elements and on information about the amount of power consumption.

According to various embodiments of the present disclosure, an electronic device includes a display and a processor, in which the processor is configured to display graphic elements on the display in response to a request of a first application and obtain first information corresponding to graphic performance of the displayed graphic elements during a first period, to identify a clock control level for controlling operation performance according to execution of the first application, to identify a clock value corresponding to the identified clock control level based on the obtained first information during a second period after the first period, and to control the operation performance according to execution of the first application by using the identified clock value.

According to various embodiments of the present disclosure, a method for controlling heat generated on a surface of an electronic device includes displaying graphic elements on a display of the electronic device in response to a request of a first application, obtaining first information corresponding to graphic performance of the displayed graphic elements during a first period, identifying a clock control level for controlling operation performance according to execution of the first application, identifying a clock value corresponding to the identified clock control level based on the obtained first information during a second period after the first period, and controlling the operation performance according to execution of the first application by using the identified clock value.

With an electronic device and a method for controlling heat generated on a surface of the electronic device according to various embodiments of the present disclosure, when a screen of the electronic device is displayed by at least one application, performance is properly controlled based on a situation of the screen, thus extending a user's use time.

BRIEF DESCRIPTION OF THE DRAWINGS

FIG. 6 illustrates a first reference table according to various embodiments of the present disclosure.

FIG. 7 illustrates a second reference table according to various embodiments of the present disclosure.

DETAILED DESCRIPTION

Figure 1:
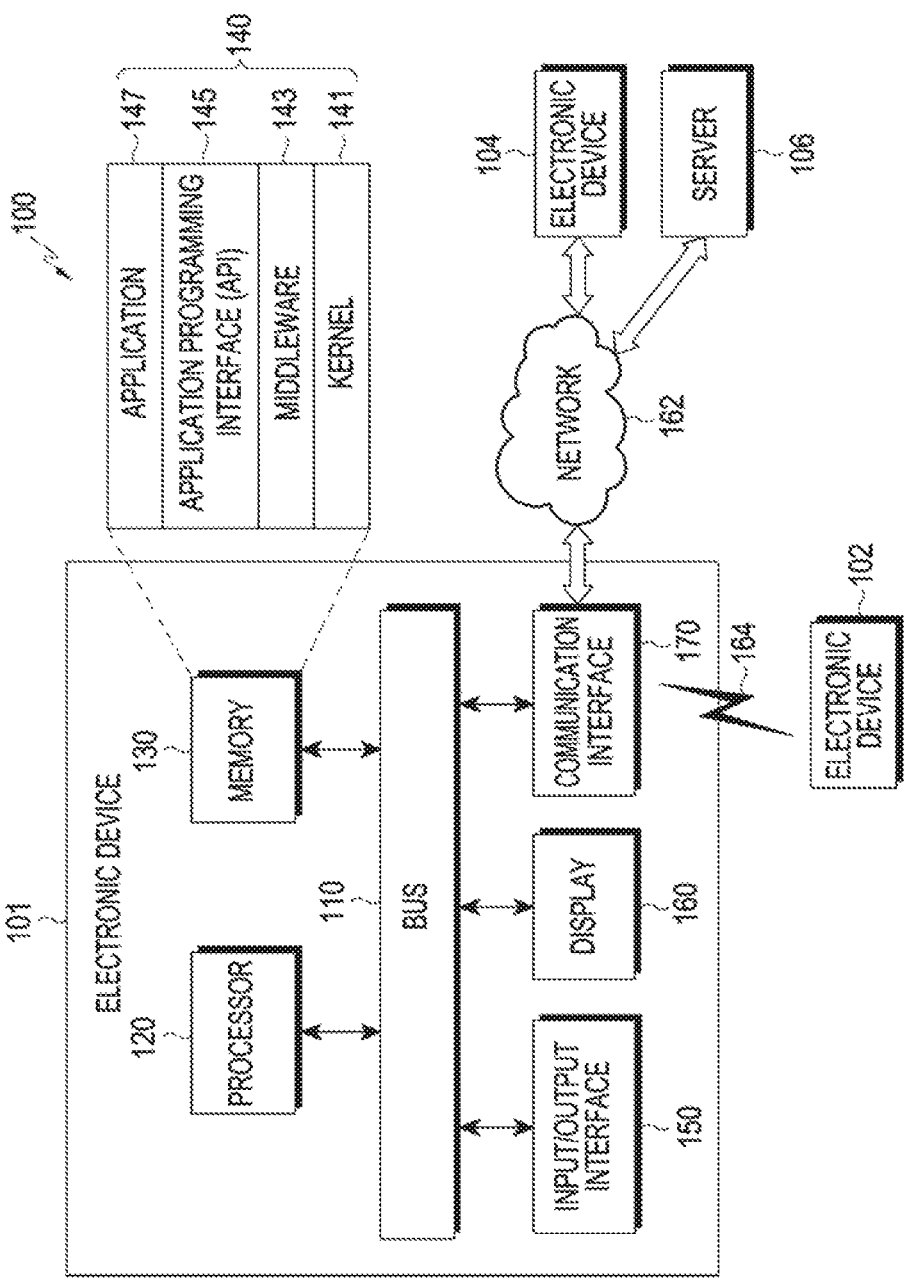
FIG. 1 illustrates a network environment according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. As used herein, such terms as "1st" and "2nd," or "first" and "second" may be used to simply distinguish a corresponding component from another, and does not limit the components in other aspect (e.g., importance or order). When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sale (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a piece of furniture, building/structure or a part of a vehicle, an electronic board, an electronic signature receiving device, a projector, or various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intellectual electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 may perform operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), or a body area network (BAN). According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), or Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), Internet, or a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

To control surface heat generation that may occur due to execution of an application including graphic elements, an electronic device according to various embodiments of the present disclosure may consider user visual sensory performance based on graphic elements displayed on a display in execution of the application and also power consumed in the electronic device in execution of the application.

The information (first information) related to the user visual sensory performance may be information related to an operation for displaying the graphic elements of the application on the display, and may include a graphic processing unit (GPU) clock, a CPU clock, a frame per second (FPS), a GPU use time, etc. The information (second information) related to the consumed power may be a measurement value of power supplied from a battery of the electronic device, i.e., an electric current value or a current value.

Figure 2:
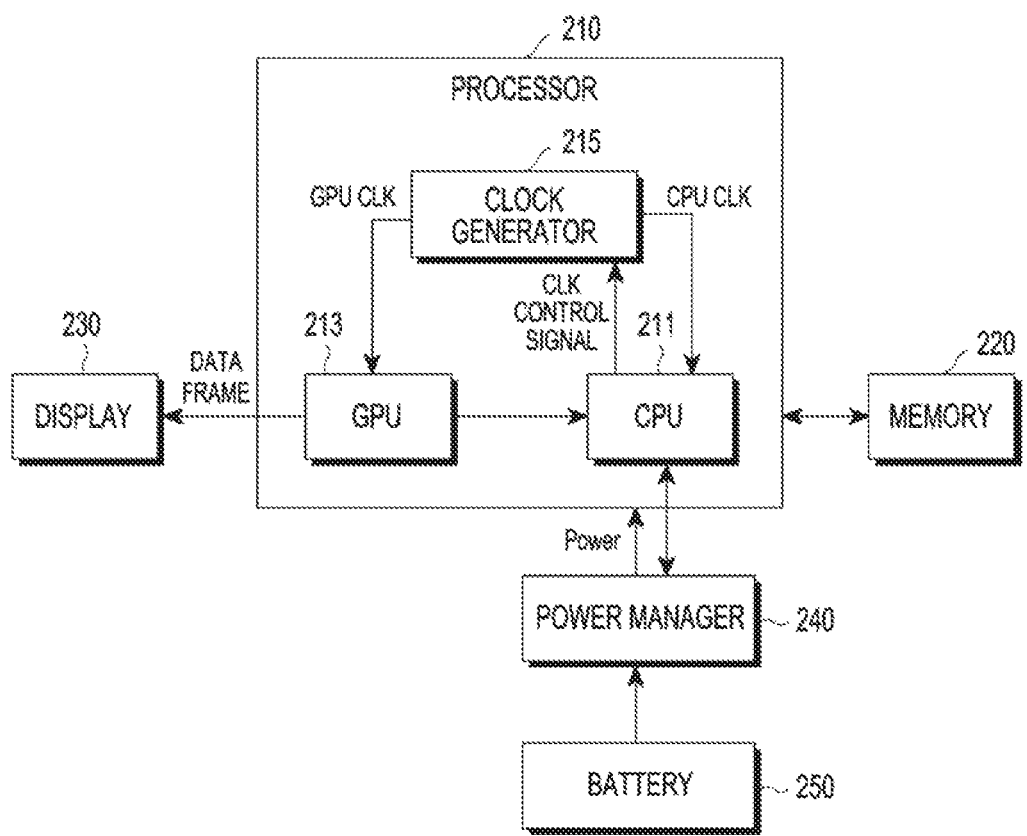
FIG. 2 illustrates an example of a configuration of an electronic device according to various embodiments of the present disclosure.
Figure 3:
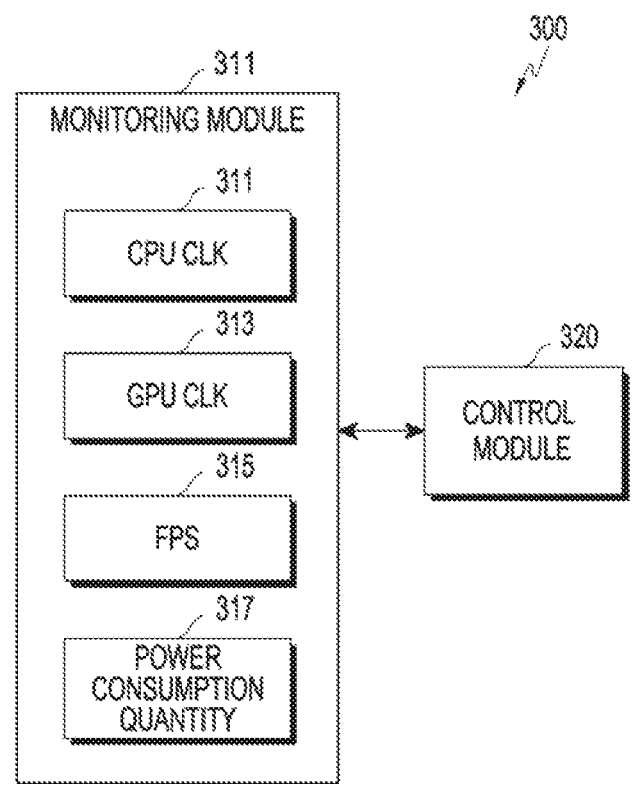
FIG. 3 illustrates an example of an internal configuration of a processor of an electronic device according to various embodiments of the present disclosure.

FIG. 2 illustrates an example of a configuration of an electronic device according to various embodiments of the present disclosure, and FIG. 3 illustrates an example of an internal configuration of a processor of an electronic device according to various embodiments of the present disclosure.

Referring to FIG. 2, an electronic device 200 according to various embodiments of the present disclosure may include a processor 210, a memory 220, a display 230, a power manager 240, and a battery 250.

According to various embodiments of the present disclosure, the processor 210 of the electronic device 200 (e.g., which is the same as or similar to the processor 120 of FIG. 1) may include a CPU 211, a GPU 213, and a clock generator 215, and may process information corresponding to an operation of the electronic device 200 and information corresponding to execution of a program, an application, or a function.

The CPU 211 may serve as a main processor of the electronic device 200, and may include a monitoring module 310 and a control module 320 as illustrated in FIG. 3. The monitoring module 310 may obtain the first information (e.g., information expressing sensory performance) and the second information (e.g., information affecting heat generation) by monitoring a CPU clock (CPU CLK) 311, a GPU clock (GPU CLK) 313, an FPS 315, a power consumption quantity 317, etc. The monitoring module 310 may temporarily store the information obtained by the monitoring in a register and use the monitored information when identifying whether an executed application is a control target. The monitoring module 310 may collect the first information and the second information by monitoring a set monitoring time Mtime under control of the control module 320. The control module 320 may calculate an average value of information collected during the monitoring time, and store the calculated average value of the information in the memory 220. The sensory performance may a degree to which a user visually recognizes an image displayed on the screen according to an FPS. For example, in a case where the image is output on the screen according to an FPS greater than or equal to a set reference value, a frame rate increases such that the image is gently expressed on the screen, resulting in high sensory performance, whereas in a case where the image is output on the screen according to an FPS less than the set reference value, the frame rate decreases such that visual discontinuity occurs between frames, that is, the image is not smoothly expressed on the screen, resulting in low sensory performance.

According to various embodiments of the present disclosure, the CPU 211 may control the GPU 213 and the clock generator 215 and may operate according to a CPU clock generated from the clock generator 215. The CPU 211 may monitor a CPU clock for each monitoring time until termination of an application. The CPU 211 may receive information about a GPU clock and information about an FPS, which are transmitted from the GPU 213, and monitor the received GPU clock information and FPS information, each the monitoring time until termination of the application. According to various embodiments of the present disclosure, the CPU 211 may monitor information about a power consumption quantity identified by the power manager 240.

According to various embodiments of the present disclosure, the CPU 211 may compare an average value of the monitored information with a set reference value to identify whether the application is a control target.

According to various embodiments of the present disclosure, when a monitored FPS is higher than a visual performance target FPS, the CPU 211 may perform clock control with a CPU control clock or a GPU control clock because small reduction of sensory performance is expected.

According to various embodiments of the present disclosure, when a monitored frame drop rate is lower than a visual performance target frame drop rate, the CPU 211 may perform clock control with a CPU control clock or a GPU control clock because small reduction of sensory performance is expected. The frame drop rate is intended to complement visual recognition that may not be expressed for an average value of monitored FPSs. For example, assuming that sensory performance is identified as good for an FPS of 30 in average, upon occurrence of an instant drop to an FPS of 20 even when the FPS is maintained as 40 in average, the user may recognize visual discontinuity between frames due to the instant drop to the FPS of 20 in spite of the average value of the FPS greater than or equal to 30, and the frame drop rate may be used to identify that a problem occurs in sensory performance in case of the frequent occurrence of the visual discontinuity.

According to various embodiments of the present disclosure, when a monitored current value is greater than a prior experimentally set target current value, the CPU 211 may perform clock control with a CPU control clock or a GPU control clock because occurrence of heat generation is expected over continuous use.

According to various embodiments of the preset disclosure, when the application is a control target, the CPU 211 may identify control clock levels of respective clocks and store the identified control clock levels as a control policy in the memory 220. The CPU 211 may identify a priority for clock control by comparing the monitored clock levels included in the control policy with one another. The control clock level of each clock may mean, for example, a CPU clock level and a GPU clock level, in which a lower clock value is matched to a higher clock level which means a lower current consumption.

According to various embodiments of the present disclosure, when a CPU monitoring clock level is greater than a GPU monitoring clock level, the CPU 211 may identify that surface heat generation may occur first due to the GPU clock value for the GPU monitoring clock level. Thus, the CPU 211 may identify to control a GPU clock level with a higher priority. The CPU 211 may control the GPU clock by using a GPU clock value for a GPU control clock level identified to be controlled with a higher priority. The CPU 211 may transmit a control signal including the GPU clock value for the GPU control clock level to the clock generator 215. Thus, the clock generator 215 may generate a GPU clock for the GPU 213 with the received GPU clock value.

According to various embodiments of the present disclosure, when the GPU monitoring clock level is greater than the CPU monitoring clock level, the GPU 213 may identify that surface heat generation may occur first due to the CPU clock value for the CPU monitoring clock level. Thus, the CPU 211 may identify to control a CPU clock level with a higher priority. The CPU 211 may control the CPU clock by using a CPU clock value for a CPU control clock level identified to be controlled with a higher priority. The CPU 211 may transmit a control signal including the CPU clock value for the CPU control clock level to the clock generator 215. Thus, the clock generator 215 may generate the CPU clock for the CPU 211 with the received CPU clock value.

According to various embodiments of the present disclosure, the CPU 211 may set a release current value as a reference value for identifying a performance improvement condition, when a monitored current value is less than a target current expecting heat generation and a monitored temperature is lower than a limit temperature. According to various embodiments of the present disclosure, when the target current value is a current value such that a surface heat generation temperature is 40 degrees for an operation of 30 minutes, the CPU 211 may set the release current value to a current value corresponding to a surface heat generation temperature of 40 degrees for an operation of 1 hour. The CPU 211 may compare a monitored current value (power consumption quantity) with the release current value to identify the performance improvement condition for improving graphic performance of the application. When the monitored current value is less than the release current value, which satisfies the performance improvement condition, the CPU 211 may control a clock according to a control policy (a CPU clock control level and/or a GPU clock control level) identified immediately before a current control level.

According to various embodiments of the present disclosure, the CPU 211 may control the application to be driven according to a CPU clock and transmit a control signal to the GPU 213 to control the GPU 213 to operate according to the CPU clock.

According to various embodiments of the present disclosure, the GPU 213 may perform graphic processing with respect to data of the executed application and transmit processed data frames to the display 230. Herein, the data frames may be transmitted based on a set FPS. The GPU 213 may operate with the GPU clock generated by the clock generator 215, and transmit information about the generated GPU clock to the CPU 211.

According to various embodiments of the present disclosure, the GPU 213 may transmit a data frame to the display 230 according to a CPU clock received from the CPU 211 or a GPU clock generated by the clock generator 215. According to various embodiments of the present disclosure, when the CPU clock value and the GPU clock value are large, computational capability and screen rendering capability are improved, increasing the number of frames that may be expressed per unit time, such that the CPU 211 transmits more data frames to the display 230 for a set time (e.g., a monitoring time) and thus the amount of graphic elements displayed on the display 230 may become heavy.

According to various embodiments of the present disclosure, the clock generator 215 may operate under control of the CPU 211, and upon receiving a clock control signal from the CPU 211, may generate a (CPU and/or GPU) clock by using a clock value included in the received clock control signal.

According to various embodiments of the present disclosure, the memory 220 of the electronic device 200 (e.g., the memory 130 of FIG. 1) may temporarily store various data generated during execution of a program as well as a program needed for a functional operation according to various embodiments of the present disclosure. The memory 220 may roughly include a program region and a data region. The program region may store related information for driving the electronic device such as an operating system (OS) for booting the electronic device. The data region may store transmitted/received data and generated data according to various embodiments of the present disclosure. The memory 220 may include at least one storage medium of a flash memory, a hard disk, a multimedia card micro type memory (e.g., secure digital (SD) or extreme digital (XD)), a random-access memory (RAM), or a read only memory (ROM).

According to various embodiments of the present disclosure, the memory 220 may store a first reference table (a clock control level table) related to clocks (a CPU clock or a GPU clock) and a second reference table (a power control level table) related to a set power consumption quantity. The second reference table indicates a level of a target current value that is set through experiment that is set according to a model of the electronic device, in which a current value at a heat generation temperature (e.g., 40 degrees) at which heat generation is expected during a set time is set as the target current value. The memory 220 may store an average value of information collected in the CPU 211 during a monitoring time. The memory 220 may store a driving program for the executed application or data received from another external electronic device due to execution of the application.

According to various embodiments of the present disclosure, the display 230 (that is the same as or similar to the display 150 of FIG. 1) may display operation execution information according to operation control from an operation executer (not shown) and an application list or display an execution result with respect to a set application. When the display 230 is implemented with a touch screen, the display 230 may correspond to the touch screen of the input interface. When the display 230 is implemented with a touch screen, the display 230 may display various information generated by a user's touch.

According to various embodiments of the present disclosure, the display 230 may display a web page including web information provided on a web site due to an electronic purchase service, information received through the input interface (e.g., input information or a captured image), and information read from the memory 220 (e.g., payment information or purchase history information).

According to various embodiments of the present disclosure, the display 230 may include at least one of an LCD, a thin film transistor (TFT)-LCD, an organic light-emitting diode (OLED), an LED, an active matrix OLED (AMO-LED), a flexible display, or a three-dimensional (3D) display. Some displays among them may be configured as a transparent type or a light-transmission type through which an outside may be seen. These displays may be configured as a transparent display including a transparent OLED (TOLED).

According to various embodiments of the present disclosure, the electronic device 200 may include a communication module (not shown) capable of communicating with external devices. The communication module (e.g., the communication interface 170 of FIG. 1) may communicate with another electronic device (e.g., the electronic device 102 or 104 or the server 106 of FIG. 1) under control of the processor 210. The communication module according to various embodiments of the present disclosure may transmit and receive data associated with an executed operation with another electronic device under control of the processor 210. According to various embodiments of the present disclosure, the communication module may receive the first reference table associated with clocks (a CPU clock or a GPU clock) and the second reference table associated with a set current consumption quantity from an another external electronic device. The communication module may download a driving program of an application from another external electronic device, and receive data from another external electronic device or transmit information input through an input interface in association with the application to another external electronic device according to execution of the application.

The communication module may perform communication through connection to a network or device-to-device connection by using wireless communication or wired communication via a communication interface. The wireless communication may include at least one of, for example, WiFi, BT, ZigBee, Z-wave, NFC, a GPS, or cellular communication (e.g., LTE, LTE-A, LTE-Unlicensed (LTE-U), Licensed Assisted Access (LAA), CDMA, WCDMA, a UMTS, WiBro, or a GSM). The wired communication may include at least one of, for example, a USB, an HDMI, RS-232, a POTS, a universal asynchronous receiver transmitter (UART), an inter-integrated circuit (I2C), a serial peripheral interface (SPI), or a controller area network (CAN). The communication module may include any of the communication schemes that are widely known or to be developed in the future as well as the above-described communication scheme.

The power manager 240 of the electronic device 200 according to various embodiments of the present disclosure may apply power supplied from the battery 250 to other internal devices of the electronic device 200. The power manager 240 may measure the power supplied from the battery 250 under control of the CPU 211 and transmit the measured power to the CPU 211.

As such, in various embodiments of the present disclosure, main components of the electronic device 200 have been described using the electronic device 200 of FIG. 2. However, in various embodiments of the present disclosure, all the components illustrated in FIG. 2 are not essential components, and the electronic device 200 may be implemented with components more or less than the illustrated components. Positions of the main components of the electronic device 200 described with reference to FIG. 2 may be changed according to various embodiments of the present disclosure.

According to various embodiments of the present disclosure, an electronic device may include a display and a processor, in which the processor is configured to display graphic elements on the display in response to a request of a first application and obtain first information corresponding to graphic performance of the displayed graphic elements during a first period, to identify a clock control level for controlling operation performance according to execution of the first application, to identify a clock value corresponding to the identified clock control level based on the obtained first information during a second period after the first period, and to control the operation performance according to execution of the first application by using the identified clock value.

According to various embodiments of the present disclosure, the processor may be configured to set a release current value to a current level lower than a set target current value, when a monitored current value is less than a target current value in which heat generation in the electronic device is expected and a temperature monitored in the electronic device is less than a limit value and to control the operation performance according to execution of the first application by using a clock value corresponding to a clock control level identified in a previous period, when the monitored current value is less than the release current value.

According to various embodiments of the present disclosure, the processor may be configured to identify whether the first application is executed before the display is turned on, when the display is turned on and to control the operation performance according to execution of the first application by using a clock value corresponding to a previously set clock control level, when the first application is executed before the display is turned on.

According to various embodiments of the present disclosure, the processor may be configured to identify the clock control level based on the first information and second information associated with a power consumption quantity of the electronic device and to reset a control policy including the identified clock control level when the first application is terminated.

According to various embodiments of the present disclosure, the processor may be configured to delete the first information and the second information when the first application is terminated and a second application is executed during the first period, and to collect third information corresponding to graphic performance of graphic elements of the second application and fourth information associated with a power consumption quantity of the electronic device during the first period.

According to various embodiments of the present disclosure, the first information may include a CPU clock, a GPU clock, and an FPS according to execution of the first application, and the second information may include a current value calculated using a voltage applied from the battery and a value of a resistor connected to the processor.

According to various embodiments of the present disclosure, the processor may be configured to identify whether the first application is a control target, based on the first information collected during the first period and the second information associated with the power consumption quantity of the electronic device.

According to various embodiments of the present disclosure, the processor may be configured to identify that the first application is a control target, when information associated with an amount of the graphic elements, included in the first information, is greater than or equal to a set first graphic reference value.

According to various embodiments of the present disclosure, the processor may be configured to identify that the first application is a control target, when an FPS included in the first information is greater than or equal to a set FPS reference value.

According to various embodiments of the present disclosure, the processor may be configured to identify that the first application is a control target application, when a current value included in the second information is greater than or equal to a set target current value.

According to various embodiments of the present disclosure, the processor may be configured to identify a priority among GPU clock control levels based on a CPU clock control level identified based on a monitoring CPU clock and a monitoring GPU clock, when the first information includes the monitoring CPU clock and the monitoring GPU clock.

Figure 4:
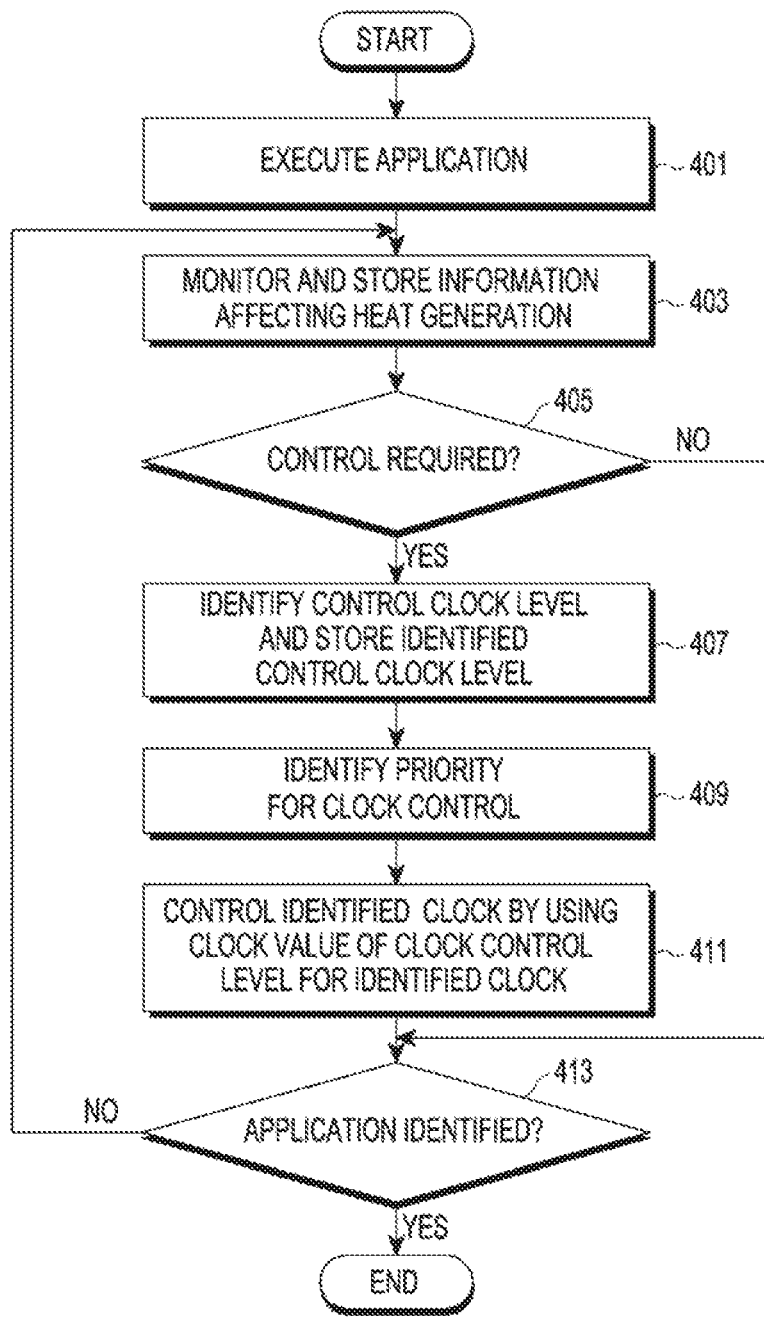
FIG. 4 is a flowchart illustrating an operation procedure of an electronic device according to various embodiments of the present disclosure.

FIG. 4 is a flowchart illustrating an operation procedure of an electronic device according to various embodiments of the present disclosure.

In the operation procedure illustrated in FIG. 4 according to various embodiments of the present disclosure, a description will be made assuming that an application including graphic elements expecting surface heat generation is executed as the application consumes current over a set reference.

Referring to FIG. 4, an electronic device (e.g., the electronic device 101 of FIG. 1 or the electronic device 203 of FIG. 2) according to various embodiments of the present disclosure may execute a specific application in operation 401. According to various embodiments of the present disclosure, the electronic device may execute the specific application requested by the user after the screen of the display is turned on. After execution of the specific application, the electronic device may recognize that the specific application includes many graphic elements, thus lowering sensory performance based on graphic elements displayed on the display to repeat the following operations for controlling surface heat generation caused by execution of the specific application during a preset monitoring time until termination of the specific application.

In operation 403, the electronic device may set factors (e.g., a GPU clock, a CPU clock, an FPS, a runtime for identifying a use time, and/or a power consumption quantity (current value)) for predicting surface heat generation of the electronic device, caused by execution of the application, monitor information about the set factors during the monitoring time, and store information collected through the monitoring. According to various embodiments of the present disclosure, the electronic device may calculate an average value of the collected information and store an average value corresponding to respective factors upon termination of the monitoring time.

According to various embodiments of the present disclosure, the electronic device may further perform an operation for identifying whether the executed application is terminated during operation 403. When identifying that the application is terminated during the monitoring, the electronic device may identify whether another application is executed during the monitoring time, and when identifying that the other application is executed during the monitoring time, the electronic device may reset the factors to be monitored and repeat operation 403. In this case, the electronic device may reset factors to be monitored for the other application in operation 403. On the other hand, when identifying that the other application is not executed during the monitoring time, the electronic device may terminate an operation.

According to various embodiments of the present disclosure, when the application is temporarily stopped and resumed during the monitoring, the electronic device may perform operation 403 without terminating the operation. According to various embodiments of the present disclosure, when the application is terminated and another application is not executed during the monitoring, the electronic device may wait for a specific time without terminating the operation, and then terminate the operation when the application is not resumed. Herein, when the application is resumed, the electronic device may repeat operation 403.

In operation 405, the electronic device may identify using the information collected through the monitoring whether the executed application requires control, that is, the executed application is a control target. When identifying that the application requires control, the electronic device may perform operation 407; otherwise, the electronic device may perform operation 413. According to various embodiments of the present disclosure, the electronic device may compare each of an average GPU clock, a monitored FPS, and/or a monitored current value with a corresponding reference value, and when the average GPU clock, the monitored FPS, and/or the monitored current value is greater than the reference value, identify that surface heat generation of the electronic device is expected and identify that a clock of the application needs to be controlled.

According to various embodiments of the present disclosure, when the CPU monitoring clock level is greater than the GPU monitoring clock level, the electronic device may identify that surface heat generation may occur first due to the GPU clock value for the GPU monitoring clock level. Thus, the electronic device may identify to control a GPU clock level with a higher priority. The electronic device may control the GPU clock by using a GPU clock value for a GPU control clock level identified to be controlled with a higher priority. The electronic device may transmit a control signal including the GPU clock value for the GPU control clock level to the clock generator. Thus, the clock generator may generate a GPU clock with the received GPU clock value.

According to various embodiments of the present disclosure, when the GPU monitoring clock level is greater than the CPU monitoring clock level, the electronic device may identify that surface heat generation may occur first due to the CPU clock value for the CPU monitoring clock level. Thus, the electronic device may identify to control a CPU clock level with a higher priority. The electronic device may control the CPU clock by using a CPU clock value for a CPU control clock level identified to be controlled with a higher priority. The electronic device may transmit a control signal including the CPU clock value for the CPU control clock level to the clock generator. Thus, the clock generator may generate a CPU clock with the received CPU clock value.

In operation 407, when the electronic device identifies to control a clock of the application that is a control target, the electronic device may identify a CPU clock level and a GPU clock level for monitored CPU and GPU clocks, store the identified clock levels, and store control setting and each clock level when a control policy is reflected.

In operation 409, the electronic device may compare the identified CPU clock level with the identified GPU clock level to control the clock of the application and identify the clock to be controlled.

In operation 411, the electronic device may control the identified clock to be generated by using a clock value of a clock control level for the identified clock.

In operation 413, the electronic device may identify whether the application is terminated. When identifying that the application is terminated, the electronic device may terminate the operation, and when identifying that the application is not terminated, the electronic device may monitor information affecting heat generation during the next monitoring time.

The electronic device according to the operation procedure of FIG. 4 has been described assuming execution of an application including many graphic elements, but a particular application may be executed prior to turning on the display based on the operation procedure of FIG. 4. Thus, the electronic device according to various embodiments of the present disclosure may identify whether the application is already executed after the display is turned on. According to various embodiments of the present disclosure, when there is no input through the user interface during a specific time while the executed application is not terminated, the screen of the display may enter an idle state to reduce power consumption. In this case, the electronic device may not perform the operation procedure illustrated in FIG. 4 because surface heat generation is not likely to occur due to power consumption caused by graphic elements displayed on the display. On the other hand, when the display switches to the on state, which means switched to an environment where a possibility of surface heat generation occurring due to display of graphic elements is high, the electronic device may identify whether an application including many graphic elements is executed.

According to various embodiments of the present disclosure, prior to operation 401, to identify the current power consumption quantity, the electronic device may identify whether the obtained current value is greater than a target current value that is a reference value for expecting surface heat generation. The identification of the power consumption quantity may be performed, for example, every one minute, and the obtained current value may be stored in the memory. When identifying that the obtained current value is greater than the target current value, the electronic device may identify that an application having a high current power consumption quantity is currently executed. The electronic device may identify whether there is a control policy corresponding to the executed application, and when identifying that there is no corresponding control policy, the electronic device may set factors to be monitored for setting the control policy and perform operation 403 of FIG. 4 to monitor the set factors (e.g., a GPU clock, a CPU clock, an FPS, a use time, and a current value). On the other hand, when there is a previous control policy that is previously set, the electronic device may perform operation 403 based on the previous control policy. According to various embodiments of the present disclosure, the electronic device may control a clock corresponding to execution of an application based on the previous control policy (the CPU clock level and/or the GPU clock control level) of the executed application, set a control policy to lower sensory performance through the operation procedure of FIG. 4 during the next monitoring time, and control the clock corresponding to execution of the application according to the set control policy.

According to various embodiments of the present disclosure, the electronic device may initialize clock count information (No. of CLK CTRL) for counting control of a clock (CLK) that is an operating frequency associated with performance of an internal processing module (e.g., a CPU and/or a GPU) of the electronic device operating for execution of the application, and stop count information (No. of STOP CTRL) and runtime check information for performing repetitive check without immediately terminating the operation in a case where the application is not stopped or when clock control is not needed or is impossible. Herein, the runtime check information may be used to give flexibility of a target current value as use time information that is a result of calculating a time in which the user needs an algorithm for controlling a clock by setting monitoring and a control policy for control of heat generation on average.

Figure 5:
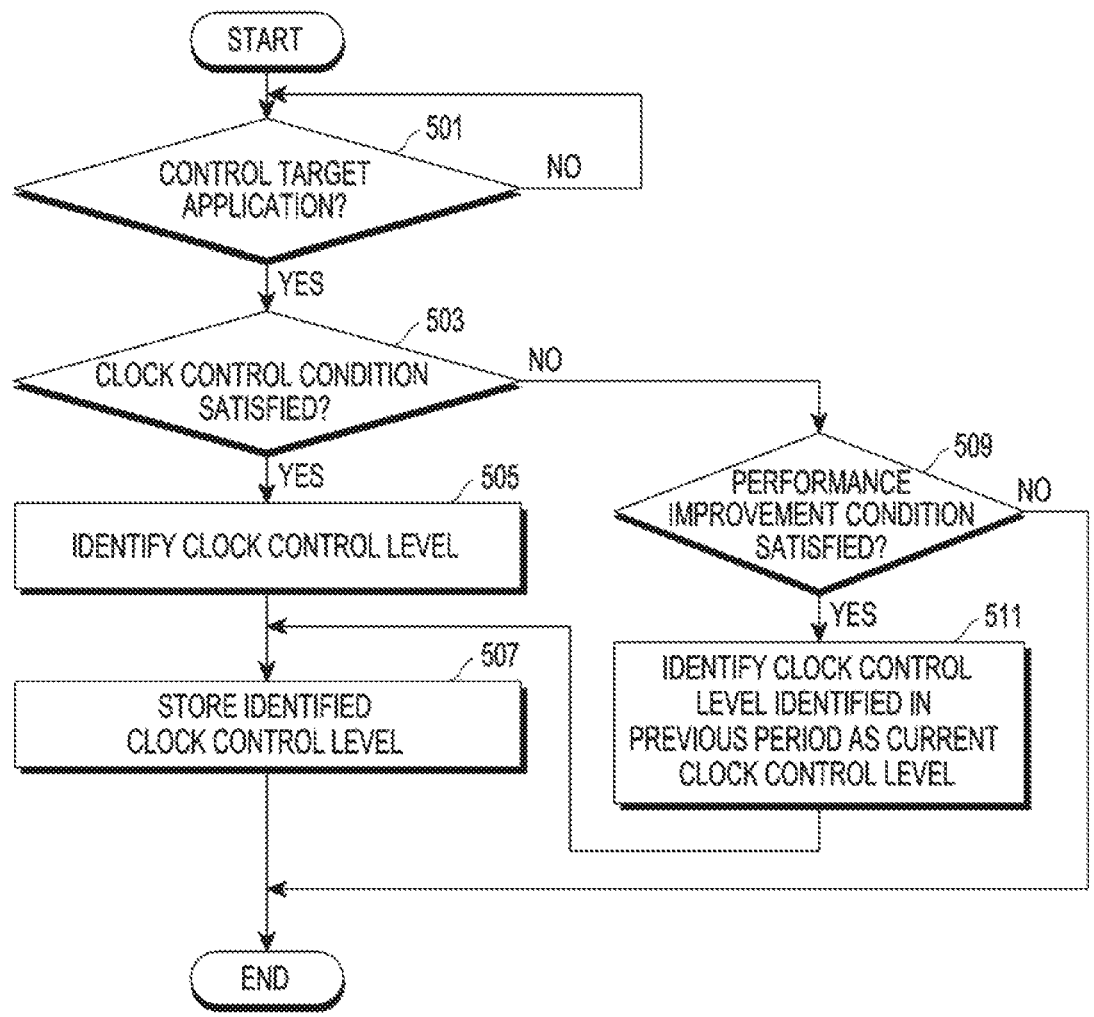
FIG. 5 is a flowchart illustrating an operation procedure of an electronic device according to various embodiments of the present disclosure.

FIG. 5 is a flowchart illustrating an operation procedure of an electronic device according to various embodiments of the present disclosure.

Referring to FIG. 5, the electronic device may identify whether a monitored application is a control target when the monitoring time ends.

In operation 501, the electronic device may identify based on a GPU clock and a GPU use time whether the application to be monitored is a control target application as an application including graphic elements. When identifying that the application to be monitored is a control target application, the electronic device may perform operation 503; otherwise, the electronic device may perform operation 501 again. According to various embodiments of the present disclosure, the electronic device may identify whether the application to be monitored is an application including many graphic elements by identifying whether an average value of GPU clocks obtained through monitoring, (AVG.GPU CLK), is greater than a set graphic reference value (e.g., Heavy GPU CLK) and a GPU use time (AVG.GPU Util) is greater than a set use time reference value (e.g., Heavy GPU Util). The graphic reference value and the use time reference value may be values defined and identified for a configuration and performance of a development system of the electronic device, respectively.

According to various embodiments of the present disclosure, when identifying in operation 501 that the application to be monitored is not an application including many graphic elements, the electronic device may count stop count information (No. of stop CTRL+1), perform monitoring like operation 403 of FIG. 4 until the stop count information exceeds a preset number of times (e.g., 3), and repeat operation 501. When the stop count information exceeds a preset number of times, the electronic device may terminate the operation.

On the other hand, when identifying in operation 501 that the application to be monitored is a control target application, the electronic device may identify whether the application satisfies at least one control condition in operation 503.

When identifying in operation 503 that the application to be monitored satisfies the control condition, the electronic device may identify a clock control level in operation 505. According to various embodiments of the present disclosure, the electronic device may identify a clock control level based on monitored factors (first information and second information) from a clock control level reference table as illustrated in FIG. 6. Herein, the clock control level reference table may be a reference table that is defined and set through experiment in development of the electronic device. According to various embodiments of the present disclosure, the electronic device may store two types of clock control reference tables by setting a level for each clock capable of performing a chipset operation for each model or briefly setting the level by mapping CPU and GPU clocks based on current or performance in development. For example, for a monitored average CPU clock of 1.156 GHz, the electronic device may identify level 5 from table 601 and level 3 from table 603. For a monitored GPU clock of 695 MHz, the electronic device may identify level 2 from both tables 601 and 603. Herein, the electronic device may identify the CPU clock level to be a level higher than a monitored value to prevent control from being performed at 1.0 GHz while skipping 1.1 GHz.

In operation 507, the electronic device may store the identified clock control level. According to various embodiments of the present disclosure, the electronic device may store the monitored information (first information and second information). This is intended to refer to a level before and/after each control, and for future performance recovery, fast return to a previous clock control level may be possible. The electronic device may set stop count information to "1".

On the other hand, when identifying in operation 503 that the application to be monitored does not satisfy the control condition, the electronic device may identify whether the application satisfies a performance improvement condition for improving graphic performance of the application in operation 509. When identifying in operation 509 that the application satisfies the performance improvement condition, the electronic device may identify a clock control level identified in a previous period to be a clock control level in a current period and store a clock control level identified in operation 507, in operation 511. On the other hand, when identifying in operation 509 that the application does not satisfy the performance improvement condition, the electronic device may terminate the operation.

The at least one control condition according to various embodiments of the present disclosure may be a condition for identifying whether a control target application needs control based on monitoring information, i.e., the monitored first and second information. The first information may include a CPU CLK, a GPU CLK, and an FPS according to execution of the first application, and the second information may include a current value calculated using a voltage applied from the battery and a value of a resistor connected to the processor.

According to the operation procedure of FIG. 5, the electronic device may check the monitoring information (e.g., the monitored first and second information) based on, for example, a first control condition and a second control condition to identify whether the control target application needs control. According to various embodiments of the present disclosure, when the first information satisfies the first control condition or/and the second information satisfies the second control condition, the electronic device may identify a clock control level based on the monitored information as in operation 505 of FIG. 5 and store the identified clock control level.

The first control condition according to various embodiments of the present disclosure may mean a case where a monitoring FPS is greater than a target FPS, a case where a monitoring period is shorter than a target period, or a case where a monitoring drop rate is higher than a target drop rate. In this case, the electronic device may identify a clock control level based on the monitoring FPS, the monitoring period, or/and the monitoring drop rate.

The second control condition according to various embodiments of the present disclosure is a condition for comparing a monitoring current with a target current, and may mean a case where the monitoring current is greater than the target current (monitoring current>target current @AVG. of Heavyruntime). In this case, the electronic device may identify a clock control level based on the monitoring FPS, the monitoring period, and/or the monitoring drop rate, and store the identified clock control level.

According to various embodiments of the present disclosure, when the application satisfies both the first control condition and the second control condition, the electronic device may identify a clock control level based on the monitoring period and/or the monitoring drop rate, and store the identified clock control level.

On the other hand, when the application does not satisfy the first control condition, that is, the monitoring FPS is not greater than the target FPS, when the monitoring period is not shorter than the target period, or when the monitoring drop rate is not higher than the target drop rate, the electronic device may perform or terminate the operation procedure of FIG. 5 based on monitoring information obtained by monitoring a window again. According to various embodiments of the present disclosure, when the application does not satisfy the first control condition, the electronic device may identify whether clock control count information is set to 0 (No. of CLK CTRL=0). When identifying that the clock control count information is set to 0, the electronic device may count the stop count information and terminate the operation when the count value is greater than or equal to a preset value (e.g., 3); otherwise, the electronic device may monitor a window again and perform the operation procedure of FIG. 5.

Likewise, when the application does not satisfy the second control condition, the electronic device may perform or terminate the operation procedure of FIG. 5 based on monitoring information obtained by monitoring a window again in a case where the clock control count information is 0. Herein, when the clock control count information is 0, it may mean that clock control has not been performed even once and thus, clock control may be performed for the first time.

On the other hand, when the application does not satisfy either the first control condition or the second control condition and the clock control count information is not 0, the electronic device may change the clock control level to a clock control level that is set in an immediately previous monitoring period as in operation 511 of FIG. 5. In this case, the electronic device may set clock control count information to "1". Herein, when the clock control count information is not 0, it may mean that clock control has been performed once or more. In this case, the electronic device may perform an operation procedure for performance improvement.

According to various embodiments of the present disclosure, when identifying that the application does not satisfy the second condition, the electronic device may identify whether the clock control count information is set to 0 (No. of CLK CTRL=0). When identifying that the clock control count information is not 0, the electronic device may identify whether the application satisfies a performance improvement condition. According to various embodiments of the present disclosure, the electronic device may compare the monitored current value (power consumption quantity) with the release current value to identify the performance improvement condition for improving graphic performance of the application. The release current value may be set as a reference value for identifying the performance improvement condition when the release current value is lower than the target current value in which heat generation is expected and the monitored temperature is lower than the limit temperature. According to various embodiments of the present disclosure, when the target current value of the second reference table as illustrated in FIG. 7 is a current value such that a surface heat generation temperature is 40 degrees for an operation of 30 minutes, the electronic device may set the release current value to a current value corresponding to a surface heat generation temperature of 40 degrees for an operation of 1 hour. When the monitored current value is less than the release current value, the electronic device identifies that the performance improvement condition is satisfied, the electronic device may control a clock according to a control policy (a CPU clock control level and/or a GPU clock control level) identified immediately before a current control level.

According to the operation procedures illustrated in FIGS. 4 and 5 described above, the electronic device may repetitively perform clock control based on monitored information until the application is terminated or is not the control target. According to various embodiments of the present disclosure, the electronic device may stepwise lower a level that is set in the clock control reference table to lower sensory performance with respect to display of graphic elements of the application, thus reducing a power consumption quantity and thereby increasing a time required for surface heat generation. Hence, a use time of the application may be extended.

According to various embodiments of the present disclosure, a method for controlling heat generated on a surface of an electronic device includes displaying graphic elements on a display of the electronic device in response to a request of a first application, obtaining first information corresponding to graphic performance of the displayed graphic elements during a first period, identifying a clock control level for controlling operation performance according to execution of the first application, identifying a clock value corresponding to the identified clock control level based on the obtained first information during a second period after the first period, and controlling the operation performance according to execution of the first application by using the identified clock value.

According to various embodiments of the present disclosure, the method may further include identifying whether the first application is a control target, based on first information collected during the first period and second information associated with a power consumption quantity of the electronic device.

According to various embodiments of the present disclosure, the identifying of the clock control level may include setting a release current value to a current level lower than a set target current value, when a monitored current value is less than a target current value in which heat generation in the electronic device is expected and a temperature monitored in the electronic device is less than a limit value and increasing the clock control level to a clock control level identified in a previous period when the monitored current value is less than a release current value, and controlling the graphic performance of the first application according to a control policy including the increased clock control level.

According to various embodiments of the present disclosure, the method may further include identifying whether the first application is executed before the display is turned on, when the display is turned on and controlling the graphic performance of the first application based on a clock value corresponding to a previously set clock control level, when the first application is executed before the display is turned on.

According to various embodiments of the present disclosure, the method may further include resetting a control policy including the identified clock control level, when the first application is terminated.

According to various embodiments of the present disclosure, the method may further include deleting the first information and the second information when the first application is terminated and a second application is executed during the first period, and collecting third information corresponding to graphic performance of graphic elements of the second application and fourth information associated with a power consumption quantity of the electronic device during the first period.

According to various embodiments of the present disclosure, the method may further include identifying a priority among GPU clock control levels based on a CPU clock control level identified based on a monitoring CPU clock and a monitoring GPU clock, when the first information includes the monitoring CPU clock and the monitoring GPU clock.

According to various embodiments of the present disclosure, the first information may include a CPU clock, a GPU clock, and an FPS according to execution of the first application, and the second information associated with the power consumption quantity of the electronic device may include a current value calculated using a value of a resistor connected to a line of power supplied from a battery to the processor.

Figure 8:
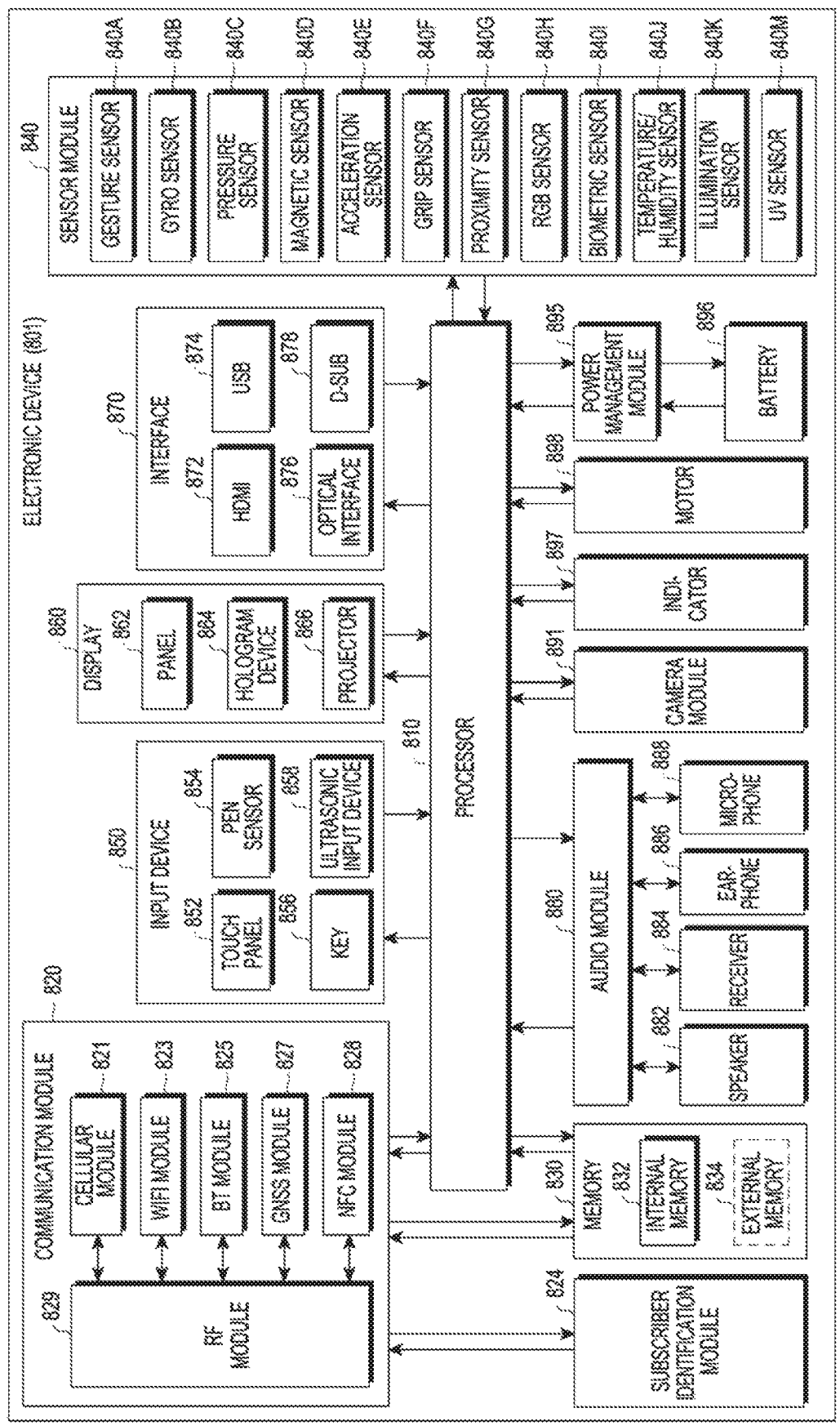
FIG. 8 is a block diagram of an electronic device according to various embodiments of the present disclosure.

FIG. 8 is a block diagram of an electronic device according to various embodiments of the present disclosure.

The electronic device 801 may form the entire electronic device 101 illustrated in FIG. 1 or a part of the electronic device 101 illustrated in FIG. 1. The electronic device 801 may include one or more processors (e.g., application processors (APs)) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898. The processor 810 controls multiple hardware or software components connected to the processor 810 by driving an operating system (OS) or an application program, and performs processing and operations with respect to various data. The processor 810 may be implemented with, for example, a system on chip (SoC). According to an embodiment of the present disclosure, the server 810 may include a graphic processing unit (GPU) and/or an image signal processor. The processor 810 may include at least some of the elements illustrated in FIG. 12 (e.g., the cellular module 821). The processor 810 loads an instruction or data received from at least one of other elements (e.g., a non-volatile memory) into a volatile memory to process the instruction or data, and stores result data in the non-volatile memory.

The communication module 820 may have a configuration that is the same as or similar to the communication interface 170. The communication module 820 may include, for example, the cellular module 821, a WiFi module 823, a Bluetooth (BT) module 825, a GNSS module 827, a near field communication (NFC) module 828, and a radio frequency (RF) module 829. The cellular module 821 may provide, for example, a voice call, a video call, a text service, or an Internet service over a communication network. According to an embodiment of the present disclosure, the cellular module 821 identifies and authenticates the electronic device 801 in a communication network by using the SIM 824 (e.g., a SIM card). According to an embodiment, the cellular module 821 performs at least one of functions that may be provided by the processor 810. According to an embodiment, the cellular module 821 may include a communication processor (CP). According to some embodiment, at least some (e.g., two or more) of the cellular module 821, the WiFi module 823, the BT module 825, the GNSS module 827, and the NFC module 828 may be included in one integrated chip (IC) or IC package. The RF module 829 may, for example, transmit and receive a communication signal (e.g., an RF signal). The RF module 829 may include a transceiver, a power amp module (PAM), a frequency filter, a low noise amplifier (LNA), or an antenna. According to another embodiment, at least one of the cellular module 821, the WiFi module 823, the BT module 825, the GNSS module 827, and the NFC module 828 may transmit and receive an RF signal through the separate RF module. The SIM 824 may, for example, include a card including a SIM or an embedded SIM, and may include unique identification information (e.g., an integrated circuit card identifier (ICCID) or subscriber information (e.g., an international mobile subscriber identity (IMSI)).

The memory 830 (e.g., the memory 130) may, for example, include an internal memory 832 and/or an external memory 834. The internal memory 832 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 834 may further include flash drive, for example, compact flash (CF), secure digital (SD), micro-SD, mini-SD, extreme Digital (add), a multi-media card (MMC), or a memory stick. The external memory 834 may be functionally or physically connected with the electronic device 801 through various interfaces.

The sensor module 840 measures physical quantity or senses an operation state of the electronic device 801 to convert the measured or sensed information into an electric signal. The sensor module 840 may, for example, include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (e.g., RGB sensor), a biometric sensor 840I, a temperature/humidity sensor 840J, an illumination sensor 840K, and a ultraviolet (UV) sensor 840M. Additionally or alternatively, the sensor module 840 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 840 may further include a control circuit for controlling at least one sensor included therein. In some embodiment, the electronic device 801 may further include a processor configured to control the sensor module 840 as part of or separately from the processor 810, to control the sensor module 840 during a sleep state of the processor 810.

The input device 850 may include, for example, a touch panel 852, a (digital) pen sensor 854, a key 856, or an ultrasonic input device 858. The touch panel 852 may use at least one of a capacitive type, a resistive type, an IR type, or an ultrasonic type. The touch panel 852 may further include a control circuit. The touch panel 852 may further include a tactile layer to provide tactile reaction to the user. The (digital) pen sensor 854 may include a recognition sheet which is a part of the touch panel 252 or a separate recognition sheet. The key 856 may also include a physical button, an optical key, or a keypad. The ultrasonic input device 858 senses ultrasonic waves generated by an input means through a microphone (e.g., the microphone 888) and checks data corresponding to the sensed ultrasonic waves.

The display 860 (e.g., the display 160) may include a panel 862, a hologram device 864, a projector 866, and/or a control circuit for controlling them. The panel 862 may be implemented to be flexible, transparent, or wearable. The panel 862 may be configured with the touch panel 852 in one module. According to an embodiment, the panel 862 may include a pressure sensor (or a "force sensor", interchangeably used hereinafter) capable of measuring a strength of a pressure by a user's touch. The pressure sensor may be implemented integrally with the touch panel 852 or may be implemented as one or more sensors separate from the touch panel 852. The hologram device 864 may show a stereoscopic image in the air by using interference of light. The projector 866 may display an image onto a screen through projection of light. The screen may be positioned inside or outside the electronic device 801. According to an embodiment, the interface 870 may include a high-definition multimedia interface (HDMI) 872, a universal serial bus (USB) 874, an optical communication 876, or a D-subminiature 878. The interface 870 may be included in the communication interface 170 illustrated in FIG. 1. Additionally or alternatively, the interface 870 may include, for example, a mobile high-definition link (MEL) interface, an SD card/MMC interface, or an Infrared Data Association (IrDA) standard interface.

The audio module 880 may bi-directionally convert sound and an electric signal. At least one element of the audio module 880 may be included in the input/output interface 145 illustrated in FIG. 1. The audio module 880 may process sound information input or output through the speaker 882, the receiver 884, the earphone 886, or the microphone 888. The camera module 831 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 895 manages power of the electronic device 801. According to an embodiment, the power management module 895 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 896 or the voltage, current, or temperature of the battery 296 during charging. The battery 896 may include, for example, a rechargeable battery and/or a solar battery.

The indicator 897 displays a particular state, for example, a booting state, a message state, or a charging state, of the electronic device 801 or a part thereof (e.g., the processor 810). The motor 898 may convert an electric signal into mechanical vibration or generates vibration or a haptic effect. The electronic device 801 may include a device for supporting the mobile TV (e.g., a GPU) to process media data according to a standard such as digital multimedia broadcasting (DMB), digital video broadcasting (DVB), or MediaFlo™. Each of the foregoing elements described herein may be configured with one or more components, names of which may vary with a type of the electronic device. In various embodiments, some components of the electronic device (e.g., the electronic device 801) may be omitted or may further include other elements, and some of the components may be coupled to form one entity and identically perform functions of the components before being coupled.

Figure 9:
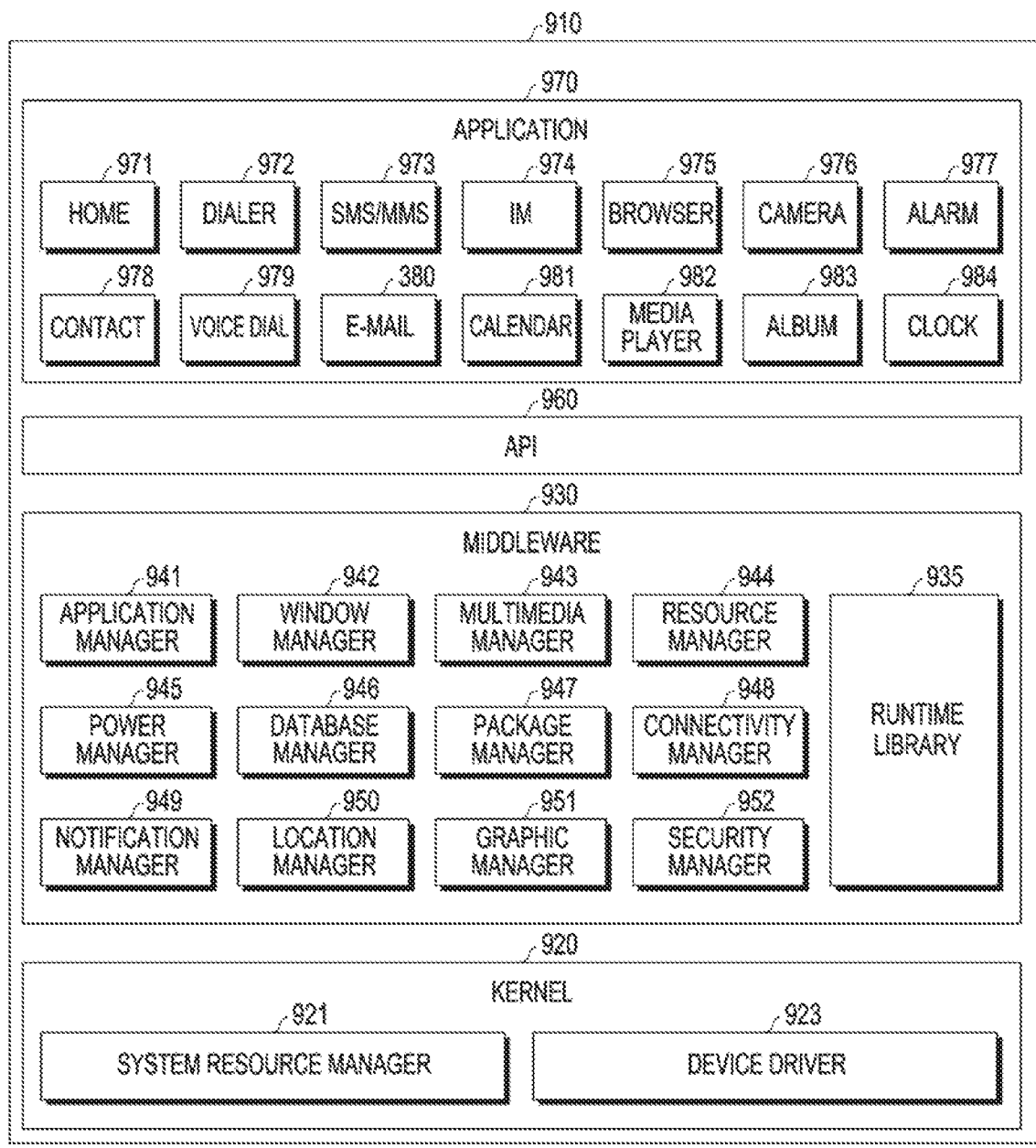
FIG. 9 is a block diagram of a programming module according to various embodiments of the present disclosure.

FIG. 9 is a block diagram of a programming module according to various embodiments.

According to an embodiment, a programming module 910 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 18, the programming module 910 may include a kernel 920 (e.g., the kernel 141), middleware 930 (e.g., the middleware 143), an application programming interface (API) 960 (e.g., the API 145), and/or an application 970 (e.g., the application program 147). At least a part of the programming module 910 may be preloaded on an electronic device or may be downloaded from an external device (e.g., the electronic device 102 or 104, or the server 106).

The kernel 920 may include a system resource manager 921 and/or a device driver 923. The system resource manager 921 may perform control, allocation, retrieval of system resources, and so forth. According to an embodiment, the system resource manager 921 may include a process management unit, a memory management unit, or a file system management unit. The device driver 923 may include, for example, a display driver, a camera driver, a Bluetooth driver, a shared memory driver, a USB driver, a keypad driver, a WiFi driver, an audio driver, or an inter-process communication (IPC) driver. The middleware 930 may include provide functions that the application 970 commonly requires or provide various functions to the application 970 through the API 960 to allow the application 970 to use a limited system resource in an electronic device. According to an embodiment, the middleware 930 may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include a library module that a compiler uses to add a new function through a programming language while the application 970 is executed. The runtime library 935 performs input/output management, memory management, or calculation function processing. The application manager 941 manages a life cycle of the applications 970. The window manager 942 manages a graphic user interface (GUI) resource used in a screen. The multimedia manager 943 recognizes a format necessary for playing media files and performs encoding or decoding on a media file by using a codec appropriate for a corresponding format. The resource manager 944 manages a source code or a memory space of the applications 970. The power manager 945 manages a battery or power and provides power information necessary for an operation of the electronic device. According to an embodiment, the power manager 945 may operate with basic input/output system (BIOS). The database manager 946 generates, searches or changes a database used for at least one application among the applications 970. The package manager 947 manages the installation or update of an application distributed in a package file format.

The connectivity manager 948 manages a wireless connection. The notification manager 949 provides an event, e.g., an arriving message, an appointment, proximity notification, etc. The location manager 950 manages location information of an electronic device. The graphic manager 951 manages, for example, a graphic effect to be provided to a user or a user interface relating thereto. The security manager 952 provides, for example, system security or user authentication. According to an embodiment, the middleware 930 may further include a telephony manager for managing a voice or video call function of the electronic device or a middleware module forming a combination of functions of the above-described components. According to an embodiment, the middleware 930 provides a module specified for each type of an OS. Additionally, the middleware 930 may delete some of existing elements or add new elements dynamically. The API 960 may be provided as a set of API programming functions with a different configuration according to the OS. In the case of Android or iOS, for example, one API set may be provided by each platform, and in the case of Tizen, two or more API sets may be provided.

The application 970 may include one or more applications capable of providing a function, for example, a home application 971, a dialer application 972, a short messaging service/multimedia messaging service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a clock application 984, a health care application (e.g., an application for measuring an exercise amount, a blood sugar, etc.), or an environment information providing application (e.g., an application for providing air pressure, humidity, or temperature information or the like). According to an embodiment, the application 970 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 970 may include an application (e.g., device health care application of mobile medical equipment) designated according to an attribute of the external electronic device. According to an embodiment, the application 970 may include an application received from the external electronic device. The at least a part of the programming module 910 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 140) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to various embodiments of the present disclosure, a computer-readable recording medium has recorded thereon a program to be executed on a computer, in which the program may be executed to cause, when executed by a processor, the processor to perform operations of displaying graphic elements on a display of the electronic device in response to a request of a first application, obtaining first information corresponding to graphic performance of the displayed graphic elements during a first period, identifying a clock control level for controlling operation performance according to execution of the first application, identifying a clock value corresponding to the identified clock control level based on the obtained first information during a second period after the first period, and controlling the operation performance according to execution of the first application by using the identified clock value.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

What is claimed is:

1. An electronic device comprising:
a display; and
a processor, wherein the processor is configured to:
display graphic elements on the display in response to a request of a first application and obtain first information corresponding to graphic performance of the displayed graphic elements during a first period;
identify whether the first application is a control target based on the first information;
identify a clock control level for controlling operation performance according to execution of the first application;

identify a clock value corresponding to the identified clock control level based on the obtained first information during a second period after the first period; and control the operation performance according to execution of the first application by using the identified clock value, wherein the first information is related to an operation for displaying graphic elements of the first application on the display as information expressing sensory performance.

2. The electronic device of claim 1, wherein the processor is configured to:

set a release current value to a current level lower than a set target current value, when a monitored current value is less than a target current value in which heat generation in the electronic device is expected and a temperature monitored in the electronic device is less than a limit value; and control the operation performance according to execution of the first application by using a clock value corresponding to a clock control level identified in a previous period, when the monitored current value is less than the release current value.

3. The electronic device of claim 1, wherein the processor is configured to:

identify whether the first application is executed before the display is turned on, when the display is turned on; and control the operation performance according to execution of the first application by using a clock value corresponding to a previously set clock control level, when the first application is executed before the display is turned on.

4. The electronic device of claim 1, wherein the processor is configured to:

identify the clock control level based on the first information and second information associated with a power consumption quantity of the electronic device; and reset a control policy comprising the identified clock control level when the first application is terminated.

5. The electronic device of claim 4, wherein the processor is configured to delete the first information and the second information when the first application is terminated and a second application is executed during the first period, and collect third information corresponding to graphic performance of graphic elements of the second application and fourth information associated with a power consumption quantity of the electronic device during the first period.

6. The electronic device of claim 4, wherein the first information comprises a central processing unit (CPU) clock, a graphic processing unit (GPU) clock, and a frame per second (FPS) according to execution of the first application, and the second information associated with the power consumption quantity of the electronic device comprises a current value calculated using a value of a resistor connected to a line of power supplied from a battery to the processor.

7. The electronic device of claim 1, wherein the processor is configured to identify whether the first application is the control target, based on the first information and second information collected during the first period, wherein the second information is associated with the power consumption quantity of the electronic device.

8. The electronic device of claim 7, wherein the processor is configured to identify that the first application is the control target, when information associated with an amount of the graphic elements, included in the first information, is greater than or equal to a set first graphic reference value.

9. The electronic device of claim 7, wherein the processor is configured to identify that the first application is the control target, when a frame per second (FPS) included in the first information is greater than or equal to a set FPS reference value.

10. The electronic device of claim 7, wherein the processor is configured to identify that the first application is the control target, when a current value included in the second information is greater than or equal to a set target current value.

11. The electronic device of claim 1, wherein the processor is configured to identify a priority among GPU clock control levels based on a CPU clock control level identified based on a monitoring CPU clock and a monitoring GPU clock, when the first information comprises the monitoring CPU clock and the monitoring GPU clock.

12. A method for controlling heat generated on a surface of an electronic device, the method comprising:

displaying graphic elements on a display of the electronic device in response to a request of a first application;

obtaining first information corresponding to graphic performance of the displayed graphic elements during a first period;

identifying whether the first application is a control target based on the first information;

identifying a clock control level for controlling operation performance according to execution of the first application;

identifying a clock value corresponding to the identified clock control level based on the obtained first information during a second period after the first period; and controlling the operation performance according to execution of the first application by using the identified clock value, wherein the first information is related to an operation for displaying graphic elements of the first application on the display as information expressing sensory performance.

13. The method of claim 12, wherein the identifying whether the first application is a control target; is based on the first information and second information collected during the first period, wherein the second information is associated with a power consumption quantity of the electronic device, wherein the first information comprises a central processing unit (CPU) clock, a graphic processing unit (GPU) clock, and a frame per second (FPS) according to execution of the first application, and wherein the second information comprises a current value calculated using a value of a resistor connected to a line of power supplied from a battery to the CPU.

14. The method of claim 12, wherein the identifying of the clock control level comprises:

setting a release current value to a current level lower than a set target current value, when a monitored current value is less than a target current value in which heat generation in the electronic device is expected and a temperature monitored in the electronic device is less than a limit value; and increasing the clock control level to a clock control level identified in a previous period when the monitored current value is less than a release current value, and controlling the graphic performance of the first application according to a control policy comprising the increased clock control level.

15. The method of claim 12, further comprising:

identifying whether the first application is executed before the display is turned on, when the display is turned on; and controlling the graphic performance of the first application based on a clock value corresponding to a previously set clock control level, when the first application is executed before the display is turned on.

16. The method of claim 12, further comprising:

resetting a control policy comprising the identified clock control level when the first application is terminated, and wherein the identifying a clock control level for controlling operation performance according to execution of the first application comprises identifying the clock control level based on the first information and second information associated with a power consumption quantity of the electronic device.

17. The method of claim 12, further comprising:

identifying a priority among GPU clock control levels based on a CPU clock control level identified based on a monitoring CPU clock and a monitoring GPU clock, when the first information comprises the monitoring CPU clock and the monitoring GPU clock.

* * * * *